(12) United States Patent
Takiguchi et al.

(10) Patent No.: US 7,182,556 B2
(45) Date of Patent: Feb. 27, 2007

(54) DRILL AND THROWAWAY INSERT (75) Inventors: Syoji Takiguchi, Ogaki (JP); Yasuhiko Kawade, Ogaki (JP)

(73) Assignee: Mitsubishi Materials Corporation, Tokyo (JP)

( * ) Notice: Subject to any disclaimer, the term of this patent is extended or adjusted under 35 U.S.C. 154(b) by 48 days.

(21) Appl. No.: 10/498,289

(22) PCT Filed: Dec. 4, 2002

(86) PCT No.: PCT/JP02/12704

§ 371 (c)(1),
(2), (4) Date: Jun. 4, 2004

(87) PCT Pub. No.: WO03/047797

PCT Pub. Date: Jun. 12, 2003

(65) Prior Publication Data

US 2005/0196244 A1   Sep. 8, 2005

(30) Foreign Application Priority Data

Dec. 7, 2001 (JP) ............................. 2001-374324
Aug. 5, 2002 (JP) ............................. 2002-227704
Nov. 14, 2002 (JP) ............................. 2002-330575

(51) Int. Cl.
*B23B 51/02* (2006.01)
*B23B 51/06* (2006.01)

(52) U.S. Cl. ...................... 408/59; 408/233; 408/713

(58) Field of Classification Search ................. 408/57, 408/59, 223, 227, 231, 233, 713
See application file for complete search history.

(56) References Cited

U.S. PATENT DOCUMENTS 2,614,813 A * 10/1952 Shepherd ................. 175/420.1

(Continued)

FOREIGN PATENT DOCUMENTS

DE         2515893 A  * 10/1976

(Continued)

OTHER PUBLICATIONS

Patent Abstracts of Japan for JP11-197923 published on Jul. 27, 1999.

*Primary Examiner*—Monica Carter
*Assistant Examiner*—Michael W. Talbot
(74) *Attorney, Agent, or Firm*—Darby & Darby (57) ABSTRACT A drill improving the aligning accuracy of an insert and achieves a stable machining operation while maintaining the strength of the drill main body. The drill includes a drill main body rotatable about an axis, and a throwaway insert detachably attached to the drill main body. The drill main body includes a concave groove opening at a distal end face thereof, the concave groove includes guiding grooves extending in the direction of the axis on an inner surface thereof, the throwaway insert includes convex portions on an outer surface that are engageable with the guiding grooves, and the concave groove is formed so as to accommodate the throwaway insert. The throwaway insert is attached to the drill main body by insertion into the concave groove in a direction from the distal end face to the concave groove while engaging the convex portions with the guiding grooves.

5 Claims, 8 Drawing Sheets

U.S. PATENT DOCUMENTS

| | | | | |
|---|---|---|---|---|
| 4,355,932 | A | * | 10/1982 | Koppelmann et al. ...... 408/188 |
| 4,854,789 | A | * | 8/1989 | Evseanko, Jr. ............. 408/125 |
| 5,287,937 | A | * | 2/1994 | Sollami et al. ............. 175/427 |
| 5,630,478 | A | * | 5/1997 | Schimke ................. 175/420.1 |
| 5,810,518 | A | * | 9/1998 | Wiman et al. ............... 407/102 |
| 5,924,826 | A | * | 7/1999 | Bystrom et al. ............. 407/103 |
| 6,960,049 | B2 | * | 11/2005 | Inayama .................... 407/103 |
| 2004/0175245 | A1 | * | 9/2004 | Takiguchi .................. 408/230 |
| 2005/0135888 | A1 | * | 6/2005 | Stokey et al. ............... 408/230 |

FOREIGN PATENT DOCUMENTS

| | | | |
|---|---|---|---|
| EP | 0 460 237 A | | 12/1991 |
| JP | 52-21489 U | | 2/1977 |
| JP | 52143590 A | * | 11/1977 |
| JP | 60221211 A | * | 11/1985 |
| JP | 63260711 A | * | 10/1988 |
| JP | 63306813 A | * | 12/1988 |
| JP | 03-202214 A | | 9/1991 |
| JP | 11-197923 A | | 7/1999 |
| JP | 2001-277029 A | | 10/2001 |
| JP | 2003175413 A | * | 6/2003 |
| JP | 2004261931 A | * | 9/2004 |
| JP | 2004283933 A | * | 10/2004 |
| JP | 2005138203 A | * | 6/2005 |
| JP | 2005169528 A | * | 6/2005 |

* cited by examiner

DISTAL END        PROXIMAL END

DISTAL END        PROXIMAL END

DRILL AND THROWAWAY INSERT

CROSS-REFERENCE TO PRIOR APPLICATION

This is a U.S. national phase application under 35 U.S.C. §371 of International Patent Application No. PCT/JP02/12704 filed Dec. 4, 2002, and claims the benefit of Japanese Patent Application Nos. 2001-374324 filed Dec. 7, 2001; 2002-227704 filed Aug. 5, 2002 and 2002-330575 filed Nov. 14, 2002 which are incorporated by reference herein. The International Application was published in Japanese on Jun. 12, 2003 as WO 03/047797 A1 under PCT Article 21(2).

TECHNICAL FIELD

The present invention relates to a drill having a throwaway insert (hereinafter referred to as an insert) which is detachably engageable with grooves formed in a distal end face of a drill main body, and relates to such an insert.

BACKGROUND ART

Conventionally, a drill is known in which a groove is formed on the distal end face of the main body of the drill, an insert is attached to the groove in a detachable manner, and the insert after having been used is thrown away without resharpening, so that resharpening processes for tools are omitted, and the time for changing tools is reduced. Such a technology in drills is disclosed, for example, in Japanese Unexamined Patent Application, First Publication No. H11-197923. In the drill disclosed in this document, an attachment hole having a circular hole shape is formed on a bottom face of a groove that is directed to a distal end, and an insert is provided with a cylindrical shank portion at a back face thereof that faces the bottom face. The insert is attached to the drill main body by inserting the shank portion into the attachment hole. The shank portion has a notch, and an engagement element is provided inside the attachment hole; therefore, the engagement element engages the notch when the shank portion is inserted into the attachment hole, and thus the insert is fixed to the drill main body.

In the above-mentioned drill, because the insert can be fixed to the drill main body just by inserting the shank portion into the attachment hole, the process of attaching the insert is simplified, and thus efficiency is obtained; however, a problem is encountered in that the shank portion may be broken if it is too thin since the connection between the insert and the drill main body is achieved by the shank portion. Moreover, aligning (centering) of the insert with respect to the drill main body is achieved only by the engagement of the shank portion with the attachment hole; therefore, the aligning accuracy may be insufficient, which may lead to degradation in machining accuracy of the drill with respect to a workpiece.

Figure 11:
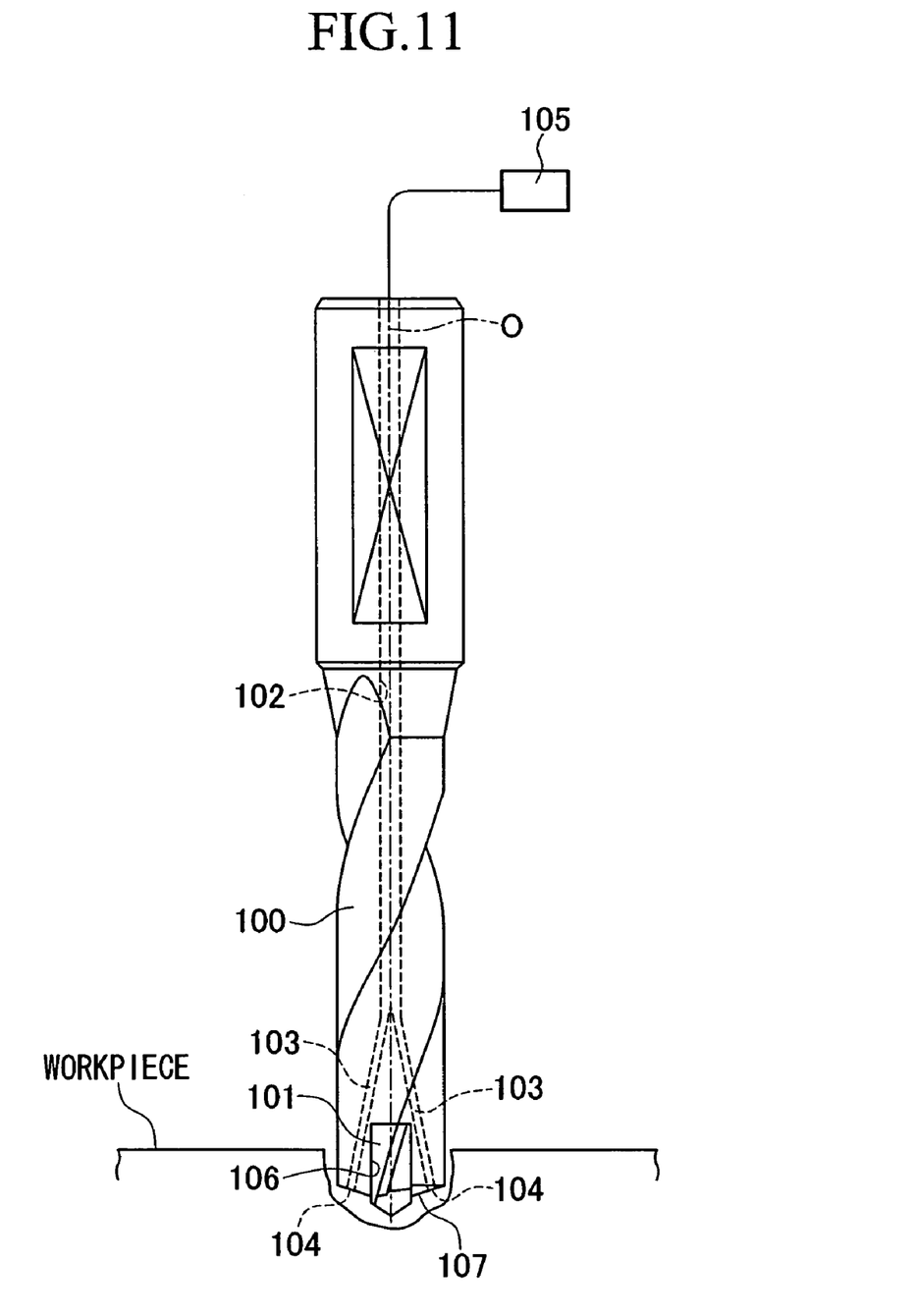
FIG. 11 is a diagram showing a conventional drill.
Figure 12:
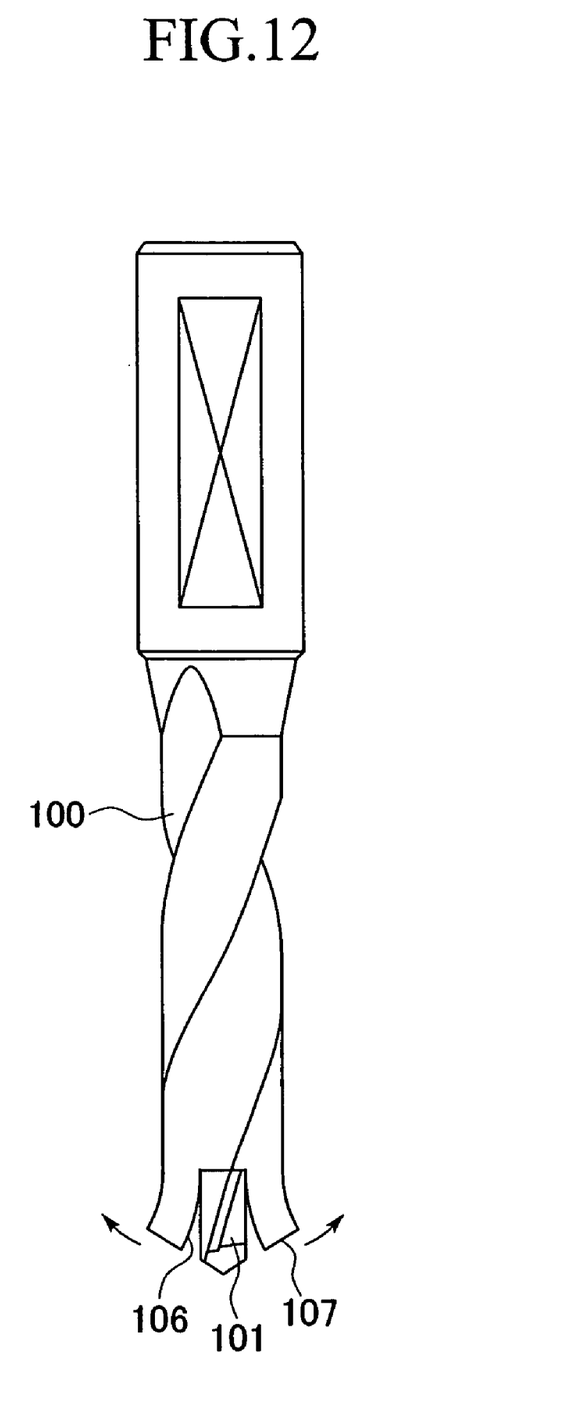
FIG. 12 is a diagram showing the problems of the conventional drill.

In addition, when a workpiece is machined by a drill, in general, machining oil is supplied during the machining process. For this, conventionally, as shown in FIG. 11, a flow path 102 is formed in a drill main body 100 so as to extend in the direction of an axis O of the drill main body 100, branched paths 103 are branched in two directions from the flow path 102 at a distal portion thereof, the branched paths 103 are connected to openings 104 which are formed in a distal end face 107 of the drill main body 100, and machining oil is provided in a machining oil supply section 105 which is connected to the proximal end of the flow path 102 so that machining oil is supplied between the workpiece and an insert 101 via the flow path 102, branched paths 103, and openings 104. However, because the branched paths 103 are formed in the distal portion of the drill main body 100, the strength of the distal portion, which is made thinner and weakened by a groove 106, is further decreased due to the branched paths 103; therefore, another problem is encountered in that the distal portion of the drill main body 100 may deform outwardly so as to be away from the groove 106, as shown in FIG. 12. Furthermore, the formation of the branched paths 103 necessitates a greater number of manufacturing processes and more complicated manufacturing processes.

DISCLOSURE OF THE INVENTION

The present invention was conceived in view of the above circumstances, and objects thereof are to provide a drill which improves the aligning accuracy between a drill main body thereof and an insert, and which achieves a stable machining operation while maintaining the strength of the drill main body, and to provide an insert which is detachably attached to such a drill.

In order to achieve the above objects, the present invention provides a drill including: a drill main body being rotatable about an axis; and a throwaway insert detachably attached to the drill main body, wherein the drill main body includes a concave groove which opens at a distal end face thereof, the concave groove includes guiding grooves extending in the direction of the axis on an inner surface thereof, the throwaway insert includes convex portions on an outer surface thereof that are engageable with the guiding grooves, the concave groove is formed so as to accommodate the throwaway insert, and the throwaway insert is attached to the drill main body by being inserted into the concave groove along a direction from the distal end face to the concave groove while engaging the convex portions with the guiding grooves.

According to the drill of the present invention, because the guiding grooves extending in the direction of the axis are formed on the inner surface of the concave groove, the throwaway insert includes convex portions on the outer surface thereof that are engageable with the guiding grooves, and a serrated structure is constituted by the guiding grooves and the convex portions, the insert can be easily attached to the drill main body just by inserting the insert from the distal end in a sliding manner while engaging the convex portions with the guiding grooves, and the aligning accuracy of the insert with respect to the drill main body can be improved. In addition, because the serrated structure is employed, the insert will not move with respect to the drill main body when a workpiece is machined by the insert while rotating the drill main body, and thus, the rotational force of the drill main body is surely and efficiently transmitted to the insert.

In this case, it is preferable that the drill main body be provided with a flow path which extends from a bottom face of the concave groove that faces the distal end face, and which opens outside the drill main body so as to allow a predetermined fluid to flow therethrough, and a gap be formed between the guiding grooves and the convex portions engaging with each other, which allows the fluid to flow between a distal end of the throwaway insert and a proximal end thereof that faces the bottom face of the concave groove. Accordingly, unlike in conventional practice, a fluid can be stably supplied to the end of the insert without providing a flow path (branched paths) for machining oil (a fluid) in the distal end portion of the drill main body. Because a flow path is not formed in the drill main body, the strength of the drill main body is maintained, a problem such as deformation can be avoided, and the manufacturing processes can be facilitated.

Even when gaps are provided, the attachment of the insert to the drill main body is stabilized since the contact area between the insert and the concave groove is ensured due to the serrated structure.

Moreover, in this case, it is more preferable that the bottom face be provided with a cavity which is connected to the gap. Accordingly, the cavity can be used as a machining oil chamber, and the supply of the machining oil to the gap is stabilized. Furthermore, at least one of ridge portions of the convex portions and ridge portions between the guiding grooves may be chamfered so as to have a flat surface, whereby a large cross section of the gap can be ensured, and a greater amount of fluid such as machining oil can be supplied.

In addition, it is preferable that the convex portions be formed such that ridge portions thereof extend in the direction of the axis and are arranged side by side in the direction crossing the axis, and each of the convex portions is provided with a tapered portion that is inclined toward the direction of insertion. Accordingly, the aligning accuracy of the insert with respect to the drill main body can be improved, and the insertion operation can be smoothly performed.

The present invention provides an insert that is insertable into a concave groove formed at a distal end portion of a drill main body, the insert including convex portions formed on an outer surface of the throwaway insert such that ridgelines thereof extend in the direction of insertion, wherein the convex portions are arranged side by side, on the outer surface, in a direction crossing the direction of insertion.

According to the insert of the present invention, provided that guiding grooves extending in the direction of insertion are formed on an inner surface of the concave groove formed in the drill main body, because the convex portions are formed on the outer surface of the insert, a serrated structure is constituted by the guiding grooves and the convex portions; therefore, the insert can be easily attached to the drill main body just by inserting the insert from the distal end in a sliding manner while engaging the convex portions with the guiding grooves, and the aligning accuracy of the insert with respect to the drill main body can be improved.

In the insert of the present invention, it is preferable that each of the convex portions be provided with a tapered portion that is inclined toward the direction of insertion. Accordingly, the insertion operation into the concave groove can be smoothly performed.

In addition, in the insert of the present invention, it is preferable that the lengths of the tapered portions formed on the convex portions, when measured in the direction of insertion, be set to be different from each other. In this case, the lengths of the tapered portions may be set depending on the shape of the distal end portion of the drill main body. Accordingly, the insertion operation can be smoothly performed since, when the insert is inserted into the concave groove of the drill main body, the convex portions can be respectively and simultaneously engaged with the guiding grooves in the concave groove.

In this case, it is more preferable that the lengths of the tapered portions be set so as to be gradually decreased, in the direction crossing the direction of insertion, from the center of the outer surface toward an end of the outer surface. More specifically, whereas the shape of the concave groove at an insertion aperture thereof as seen from the side is normally configured to be a V-shape, the convex portions can be respectively and simultaneously engaged with the concave groove by setting the lengths of the tapered portions so as to be gradually decreased, in the direction crossing the direction of insertion, from the center of the outer surface toward the end of the outer surface.

BEST MODE FOR CARRYING OUT THE INVENTION

Figure 1A:
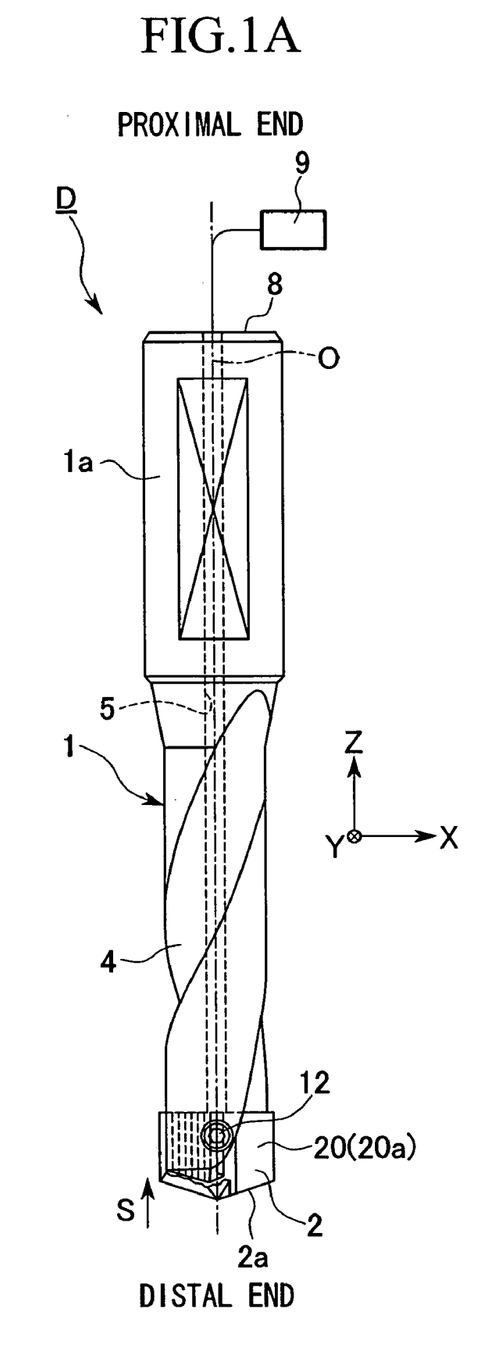
FIGS. 1A and 1B are side views showing an embodiment of a drill of the present invention.
Figure 1B:
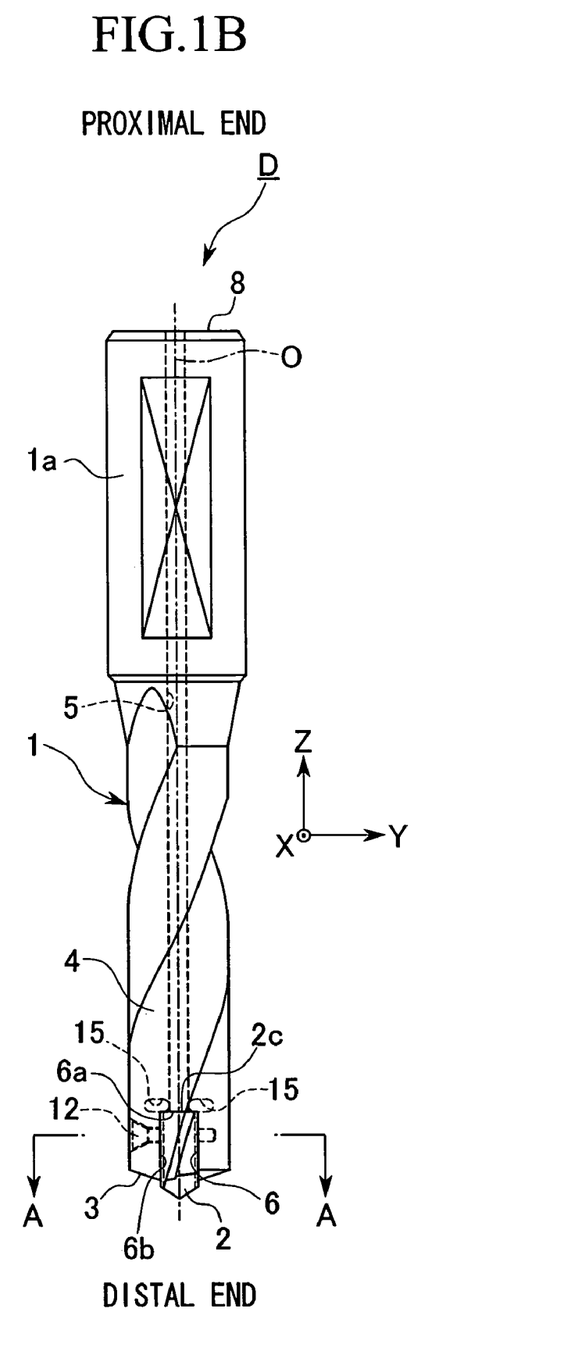
Figure 2:
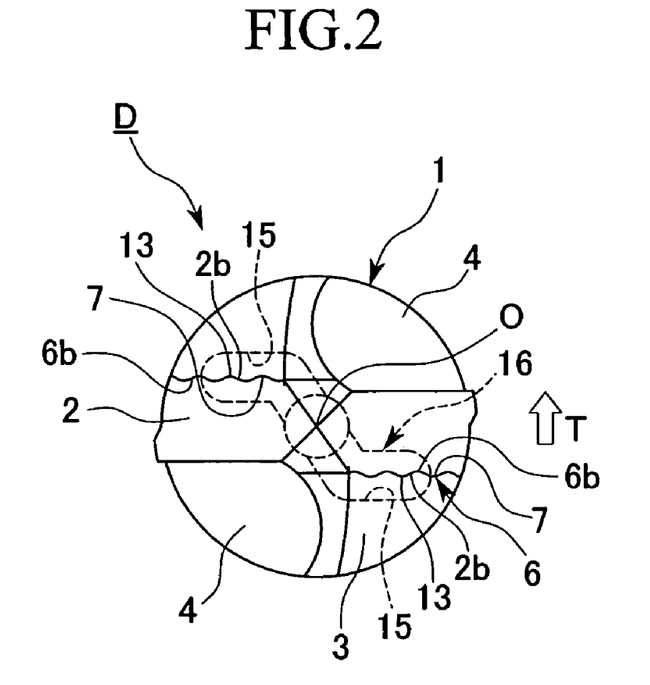
FIG. 2 is a diagram showing the drill in FIGS. 1A and 1B as viewed from a distal end side.
Figure 3:
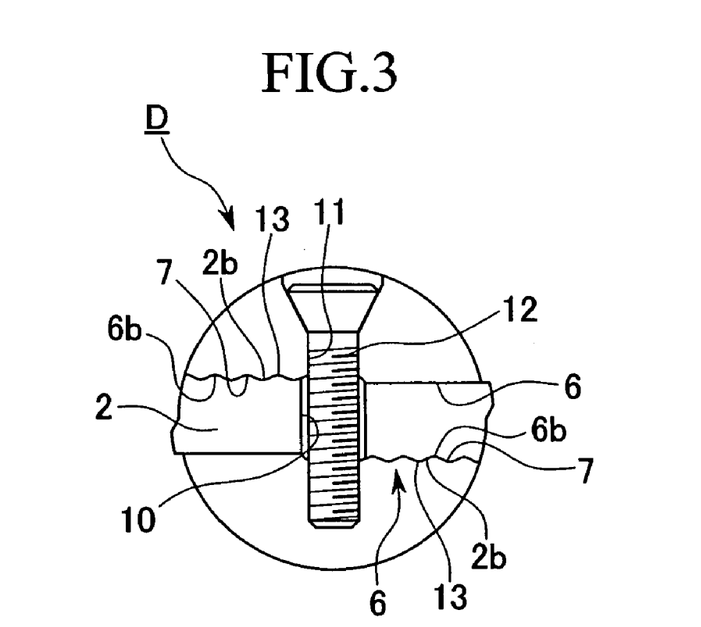
FIG. 3 is a cross-sectional view taken along the line A—A in FIG. 1B.
Figure 4:
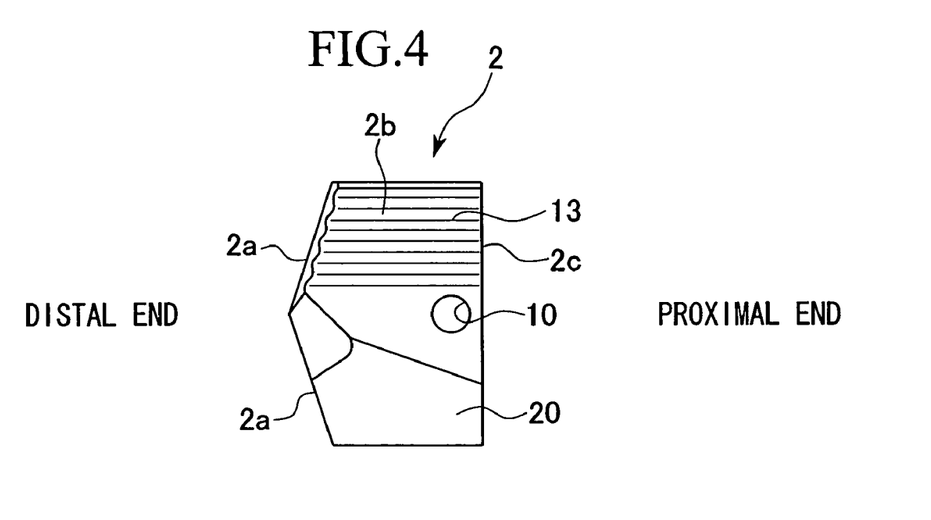
FIG. 4 is a side view of an insert.
Figure 5:
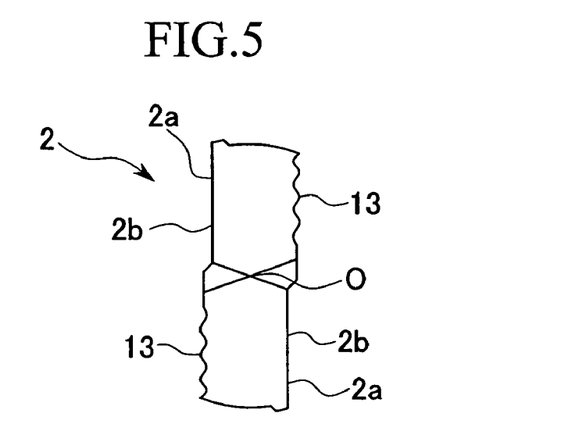
FIG. 5 is a diagram showing the insert as viewed from a distal end side.
Figure 6:
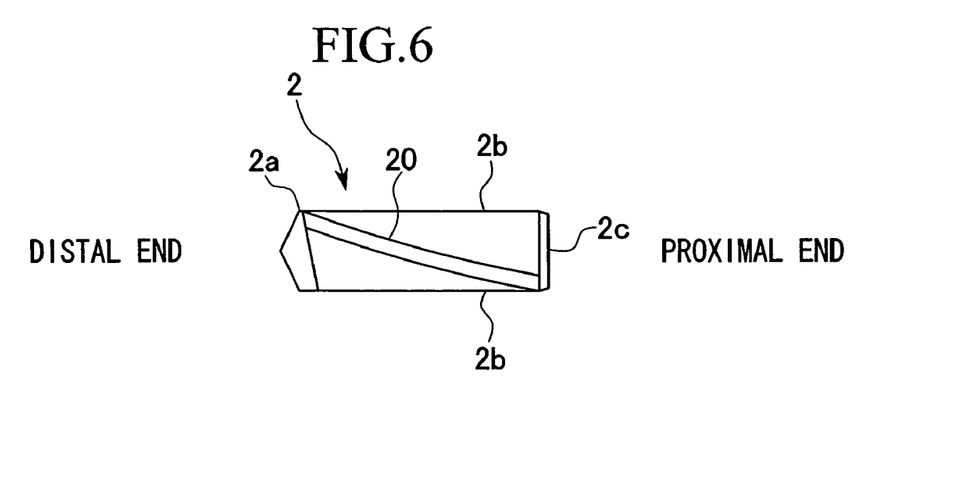
FIG. 6 is a side view of an insert.

A drill and an insert of the present invention will be described below with reference to the accompanying drawings. FIGS. 1A and 1B are side views showing an embodiment of a drill of the present invention, and in particular, FIG. 1A is a side view as viewed in the Y-direction, and FIG. 1B is a side view as viewed in the X-direction. FIG. 2 is a diagram viewing FIG. 1A from a distal end side (the Z-direction side). FIG. 3 is a cross-sectional view taken along the line A—A in FIG. B. FIG. 4 is a side view of an insert as viewed in the Y-direction, FIG. 5 is a diagram viewing FIG. 4 from the distal end side, and FIG. 6 is a side view of the insert as viewed in the X-direction. Note that the X-direction is defined as a diametric direction with respect to an axis O of a drill D in which a concave groove 6 to be explained below is formed, the Y-direction is defined as a direction perpendicular to the X-direction and the axis O, and the Z-direction is defined as a direction parallel to the axis O, in which the positive (+) direction thereof is defined as the direction from the distal end to the proximal end of the drill D.

In FIGS. 1A and 1B, the drill D includes a drill main body 1 being rotatable about the axis O, and an insert 2 detachably attached to the drill main body 1. The insert 2 includes cutting edge 2a. The drill main body 1 includes, at the proximal portion thereof, a shank portion 1a which is a large diameter portion. On the other hand, the drill main body 1 includes, at the distal portion thereof, a pair of chip discharge flutes 4 which open at a distal end face 3 of the drill main body 1. As shown in FIG. 2, the chip discharge flutes 4 are formed such that the chip discharge flutes 4 are opposite each other while having the axis O therebetween, and extend toward the proximal end while being twisted about the axis O in a direction opposite to the direction of drill rotation T during a drilling operation.

At the distal end portion of the drill main body 1, the concave groove 6 is formed. The concave groove 6 opens at the distal end face 3 of drill main body 1, and is formed so as to be concave toward the proximal end side, and so as to extend in a diametric direction with respect to the axis O. More specifically, the concave groove 6 is formed such that a portion between the walls of the chip discharge flutes 4 at the distal end that face the direction of drill rotation T is cut out along a virtual plane including the axis O and along the diametric direction (X-direction). The concave groove 6 includes a bottom face 6a which faces the distal end side and is perpendicular to the axis O, and a pair of inner faces 6b parallel to each other, each of which is perpendicular to the bottom face 6a and parallel to the axis O. As shown in FIG. 1B, the concave groove 6 opens toward the distal end face 3 in a rectangular shape as seen form the side. As shown in FIGS. 2 and 3, the symmetrical center of the concave groove 6 coincides with the axis O, and the concave groove 6 is formed so as to accommodate the insert 2.

Figure 7:
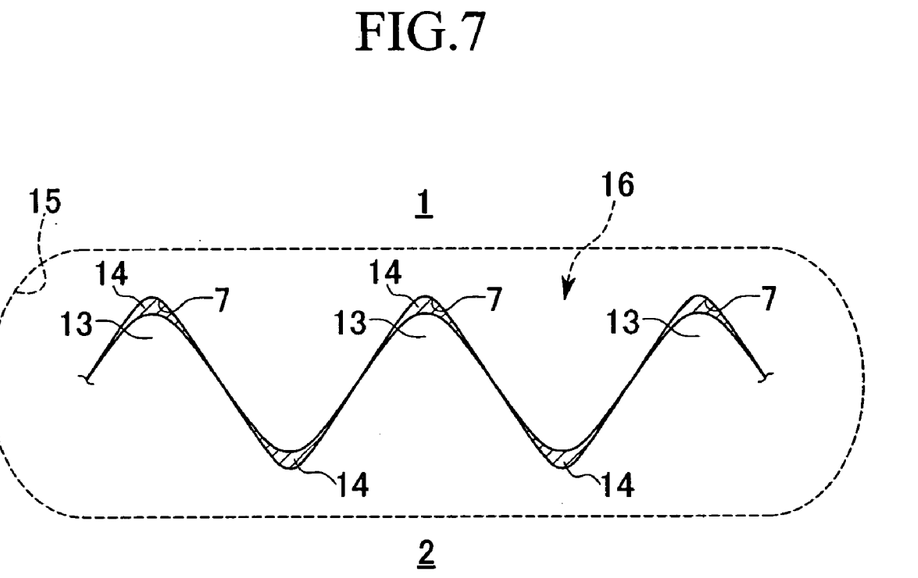
FIG. 7 is a diagram for explaining a gap.

As shown in FIGS. 1A, 1B, and 2, on the inner faces 6b of the concave groove 6, there are formed guiding grooves 7 which extend in the direction of the axis O. Each of the guiding grooves 7 includes plural grooves, which are arranged side by side in the direction crossing the axis O, and each of which extends in the direction of the axis O. The guiding grooves 7 are respectively formed on the inner faces 6b. The guiding grooves 7 are not formed on the entire surface of the inner faces 6b, and as shown in FIG. 2, each of the pair of guiding grooves 7 is formed in a region of one of the pair of inner faces 6b that faces the direction of drill rotation T and includes the vicinity of the axis O so that the guiding grooves 7 are arranged at alternating locations in the X-direction, and regions of the inner faces 6b near the axis O, which are connected to a thinning portion of the distal end face 3, are formed so as to be flat. As shown in FIG. 7, the individual grooves included in the guiding grooves 7 and formed in a substantially V-shape include concave arc portions at the bottom thereof. Ridge portions formed between adjacent grooves are formed so as to have convex arc portions whose radius is made to be greater than that of the concave arc portions at the bottom.

As shown in FIGS. 1A and 1B, the drill main body 1 is provided with a flow path 5 that extends along the axis O. The flow path 5 is formed so as to connect a proximal end face 8 of the drill main body 1 and the bottom face 6a of the concave groove 6. As shown in FIG. 1A, a machining oil supply unit 9, which is provided outside the drill main body 1 to supply machining oil (fluid) to the flow path 5, is connected to a portion of the flow path 5 at the proximal end face 8 of the drill main body 1. The machining oil supplied from the machining oil supply unit 9, which is provided outside the drill main body 1, to the flow path 5 is made to flow from a portion of the flow path 5 at the proximal end face 8 to the bottom face 6a of the concave groove 6 that faces the distal end side.

As shown in FIGS. 1B and 2, on the bottom face 6a of the concave groove 6, there are formed concave-shaped recesses 15 which may be formed by a counterboring process so as to be concave in the bottom face 6a. The inner end of each of the recesses 15 is connected to the distal end of the flow path 5. The recesses 15 respectively extend from the distal end of the flow path 5 to portions of the pair of inner faces 6b of the concave groove 6 where the guiding grooves 7 are formed, and further extend along the inner faces 6a toward the outer periphery; however, the recesses 15 do not extend to the outer edges of the bottom face 6a, i.e., the outer periphery of the drill main body 1 at the distal end, and stop within the bottom face 6. As shown in FIGS. 1B and 2, portions of the recesses 15 that extend along the guiding grooves 7 on the inner face 6b of the concave groove 6 are formed so as to be concave from the inner face 6b in the direction opposite to the direction of drill rotation T. Due to the recess 15, a cavity 16 is formed between the drill main body 1 and back face 2c of the insert 2 when the insert is disposed in the concave groove 6. The cavity 16 is used as a machining oil chamber for retaining the machining oil supplied through the flow path 5.

The insert 2 is disposed in the concave groove 6 such that the proximal end face 2c thereof faces the bottom face 6a. The insert 2 is made of a hard material such as a cemented carbide, and is formed in a substantially pentangular plate shape as shown in FIGS. 4, 5, and 6. The insert 2 is attached while being engaged with the concave groove 6. The insert 2 includes a through hole 10 that is formed at the center of the insert 2 with respect to the X-direction so as to extend in the thickness direction (in the Y-direction). As shown in FIGS. 1A, 1B, and 3, the through hole 10 is positioned so as to coincide with a mounting hole 11 when the insert is disposed in the concave groove 6, the mounting hole 11 being formed at the center of the distal end portion of the drill main body with respect to the X-direction so as to extend in the Y-direction and to open at the inner face 6b of the concave groove 6. The mounting hole 11 extends in the Y-direction from an outer periphery of one (the upper portion with respect to the concave groove in FIG. 3) of the two sections of the distal end portion of the drill main body which are formed by being divided by the concave groove 6 while the diameter thereof is reduced in a tapered manner, i.e., via a reduced diameter portion thereof, penetrates the one section, opens at the inner face 6b of the one section of the concave groove 6, further extends across the concave groove 6, and extends through the inner face 6b of the other section of the distal end portion of the drill main body 1 in the Y-direction, i.e., coaxially with a portion of the mounting hole 11 in the one section. The mounting hole 11 is formed as a stopped hole which does not penetrate through the drill main body 1, and a female thread is formed therein. By disposing the insert 2 in the concave groove 6 by inserting a bolt as a fixing element 12 from the one section into the mounting hole 11 and the through hole 10, and by screwing the bolt into the female thread, the insert 2 is fixed and connected to the drill main body 1 while the countersunk-head of the bolt as the fixing element 12 firmly contacts the reduced diameter portion, as shown in FIG. 3. The through hole 10 and the mounting hole 11 are disposed at the center with respect to the X-direction, and extend in the direction perpendicular to the axis O for the case of the fixing element (bolt) 12 that is inserted into and engaged with the through hole 10 and the mounting hole 11.

As shown in FIGS. 4 and 5, on the outer surfaces 2b of the insert 2, there are formed convex portions 13 which are engageable with the guiding grooves 7 of the drill main body 1. The convex portions 13 extend in the direction of the axis O, i.e., the ridgelines thereof extend in the direction of the axis O, and are arranged side by side in the direction crossing the axis O. The convex portions 13 are formed in regions which correspond to the portions of the concave groove 6 in which the guiding grooves 7 are formed in a state in which the insert 2 is disposed in the concave groove 6. More specifically, the convex portions 13 are respectively formed on the outer surfaces 2b of the insert 2, and the convex portions 13 are formed in the regions of the pair of outer surfaces 2b that face the direction opposite to the direction of drill rotation T and include the vicinity of the axis O so that the convex portions 13 are arranged at two alternating locations in the X-direction. The regions of the outer surfaces 2b of the insert 2 corresponding to the inner faces 6b which are formed to be flat, and which are connected to the thinning portion, are formed to be flat so as to make a surface contact with the flat portions of the concave groove 6. As shown in FIG. 7, in cross-sectional view taken along a plane perpendicular to the axis O, the ridge portions of the convex portions 13 formed in a substantially V-shape include convex arc portions. Valley portions formed between adjacent convex portions 13 are formed so as to have concave arc portions whose radii are made to be less than those of the convex arc portions, and the included angle of the V-shape of the convex portions 13 is the same as the included angle of the V-shape of the grooves of the guiding grooves 7

Moreover, as shown in FIG. 7, in a state in which the insert 2 is disposed in the concave groove 6 while the convex portions 13 are engaged with the guiding grooves 7, gaps 14 are formed between the convex portions 13 formed on the insert 2 and the guiding grooves 7 formed on the concave groove 6 of the drill main body 1, and at the apexes and valleys of the convex portions 13. More specifically, the radii of the convex arcs of the ridge portions of the convex portions 13 are set to be greater than those of the concave arcs of the grooves of the guiding grooves 7, and the radii of the concave arcs of the bottoms between the adjacent convex portions 13 are set to be less than those of the convex arcs of the ridge portions between the adjacent grooves of the guiding grooves 7. By engaging the convex portions 13 with the guiding grooves 7 so that the walls of the grooves in the guiding grooves 7 and side surfaces of the convex portions 13 having the same included angle of the V-shape as that of the guiding grooves 7 make a surface contact therebetween, the gaps 14 are formed between the ridge portions of the convex portions 13 and the bottom portions of the grooves in the guiding grooves 7, and between the valleys between the adjacent convex portions 13 and the ridge portions between the adjacent grooves in the guiding grooves 7. The size of the gaps 14 is determined so that machining oil is allowed to flow therethrough, i.e., machining oil is allowed to flow between the distal portion of the insert 2 and the proximal portion thereof, and thus, when the insert 2 is disposed in the concave groove 6, the machining oil, which is supplied to the bottom face 6a of the concave groove 6 via the flow path 5, is allowed to flow through the gaps 14. More specifically, the machining oil, which is supplied to the concave groove 6 via the flow path 5, is allowed to flow out at the distal portion of the insert 2.

In addition, the cavity 16 is formed in a portion of the bottom face 6a of the concave groove 6 which corresponds to the connection region between the guiding grooves 7 and the convex portions 13. More specifically, portions of the recesses 15 forming the cavity 16 that extend along the guiding grooves 7 in the inner faces 6b of the concave groove 6 are formed so as to be concave from the inner faces 6b in the direction opposite to the direction of drill rotation T. Accordingly, when the insert 2 is disposed in the concave groove 6, the cavity 16 is connected, over the region where the cavity 16 is formed, to the gaps 14 which are formed between the convex portions 13 and the grooves of the guiding grooves 7.

When the insert 2 is disposed in the concave groove 6, the distal end face of the insert 2 is formed in an isosceles triangular shape (V-shape), i.e., the distal end face of the insert 2 is formed so as to extend toward the proximal end side as it extends outward. The cutting edges 2a are respectively formed on the intersecting ridges between the distal end face and the rake faces 20, of the outer surfaces 2b of the insert 2, which face the direction of drill rotation T in a state in which the insert 2 is attached to the drill main body 1. The rake face 20 becomes narrower and is inclined toward the opposite outer surface 2b as it extends toward the proximal end of the insert 2, and is connected to the wall that faces the direction of drill rotation T in the mounted state. The convex portions 13 are formed on the outer surfaces 2b where the rake faces 20 are not formed. The back face 2c of the insert 2 extends in the direction perpendicular to the axis O in a state in which the insert 2 is attached to the drill main body 1, and makes a surface contact with the bottom face 6a of the concave groove 6 where the recesses 15 are not formed.

Next, regarding the drill D having the structure explained above, the operation for attaching the insert 2 to the drill main body 1 and the drilling operation will be explained below.

When the insert 2 is to be attached to the drill main body 1, the insert 2 is oriented so that the extending direction of the through hole 10 of the insert 2 coincides with the extending direction of the mounting hole 11 of the drill main body 1, and then the insert 2 is inserted into the concave groove 6 from the side of the distal end face 3 (from the open side) in the +Z direction, i.e., in the insertion direction S, which is the direction of the axis O toward the proximal end (refer to FIG. 11A). When the insert 2 is inserted into the concave groove 6, the insert 2 is inserted in a sliding manner while engaging the convex portions 13 on the outer surfaces 2b of the insert 2 with the guiding grooves 7 on the inner surfaces 6b of the concave groove 6. By inserting the insert 2, the back face 2c of the insert 2 makes a surface contact with the bottom face 6a of the concave groove 6. Because the position at which the back face 2c of the insert 2 contacts the bottom face 6a of the concave groove 6 is determined such that the through hole 10 of the insert 2 coincides with the mounting hole 11 of the drill main body 1, at this stage, the fixing element 12 can be inserted into the through hole 10 and the mounting hole 11, and the insert 2 can be connected and fixed to the drill main body 1 by screwing the fixing element 12 such as a bolt into the mounting hole 11 having the female thread.

The thickness of the insert 2 where the rake faces 20 are formed is set to be less than the thickness of the insert 2 where the convex portions 13 are formed (i.e., the thickness at the apexes of the convex portions 13). Accordingly, the insertion operation is not hindered when the insert 2 is inserted into the concave groove 6 while making the convex portions 13 slide with respect to the guiding grooves 7.

When the insert 2 is to be detached from the drill main body 1, the fixing element 12 is unscrewed from the mounting hole 11 and removed therefrom, and the insert 2 is removed from the concave groove 6 so that the insert 2 is separated from the drill main body 1.

After fixing the insert 2 to the drill main body 1, a drilling operation is applied to a workpiece while supplying machining oil from the machining oil supply unit 9 to the flow path 5 of the drill main body 1. The machining oil supplied to the flow path 5 is supplied from the end of the flow path 5 to the cavity 16 acting as a machining oil chamber. Because the cavity 16 is connected to the gaps 14, the machining oil is allowed to flow out at the distal end of the insert 2 via the gaps 14. Accordingly, the drilling operation can be performed while supplying machining oil to the workpiece.

As explained above, because the guiding grooves 7 that extend in the direction of the axis O are provided on the inner surfaces 6b of the concave groove 6, the convex portions 13 that are engageable with the guiding grooves 7 are provided on the outer surfaces 2b of the insert 2, and a serrated structure is constituted by the guiding grooves 7 and the convex portions 13, the insert 2 can be easily attached to the drill main body 1 just by inserting the insert 2 while engaging the convex portions 13 with the guiding grooves 7. Moreover, the aligning accuracy of the insert 2 with respect to the drill main body 1 can be improved. Furthermore, because the insert 2 is tightened by the fixing element 12 (bolt) such that the concave groove 6 is made narrower, and the insert 2 is pressed from the Y-direction to the direction slightly inclined with respect to the direction connecting the pair of inner surfaces 6b and 6b of the concave groove 6 in which the guiding grooves 7 are formed, the convex portions 13 can be further reliably engaged with the guiding grooves 7, and the aligning accuracy can be further improved. In addition, by employing a serrated structure, the insert 2 will not move with respect to the drill main body 1 when a workpiece is machined by the insert 2 while rotating the drill main body 1, and thus, the rotational force of the drill main body 1 is surely and efficiently transmitted to the insert 2. Accordingly, the machining process is stabilized, and high machining accuracy can be achieved.

Moreover, because the flow path 5, which connects the bottom face 6a of the concave groove 6 that faces the distal end side to the outside of the drill main body 1, is formed in the drill main body 1, and the drill main body 1 and the insert 2 are formed so that the gaps 14 are formed between the guiding grooves 7 and the convex portions 13 in the engaged state, the machining oil supplied from the flow path 5 is allowed to flow out at the distal end of the insert 2 via the gaps 14; therefore, the machining oil can be stably supplied to the distal end of the insert 2 without forming the branched paths for supplying machining oil in the distal end portion of the drill main body, as shown in FIG. 11. Because a flow path is not formed in the distal end portion of the drill main body 1, the strength of the drill main body 1 is maintained, a problem such as deformation can be avoided, and the manufacturing processes of the drill main body 1 can be facilitated.

Furthermore, because, in the engaged state, the insert 2 contacts the drill main body 1 in such a manner that the gaps 14 are formed at only locations corresponding to the apexes (ridgelines) of the convex portions 13 (i.e., locations corresponding to the valleys (groove bottoms) of the guiding grooves 7) and the valleys between the convex portions 13 adjacent to each other (i.e., locations corresponding to ridgelines of the adjacent grooves of the guiding grooves 7), and the side surfaces of the convex portions 13 make a surface contact with the walls of the guiding grooves 7 at other locations, the contact area between the insert 2 and the drill main body 1 is sufficiently ensured, and the insert 2 can be stably attached to the drill main body 1.

Moreover, because the cavity 16, acting as a machining oil chamber, is provided in the bottom face 6a of the concave groove 6 so as to be connected to the gaps 14, machining oil can be stably supplied to the gaps 14, and thus the supply of machining oil to the distal end of the insert 2 during a machining process is ensured.

Figure 8:
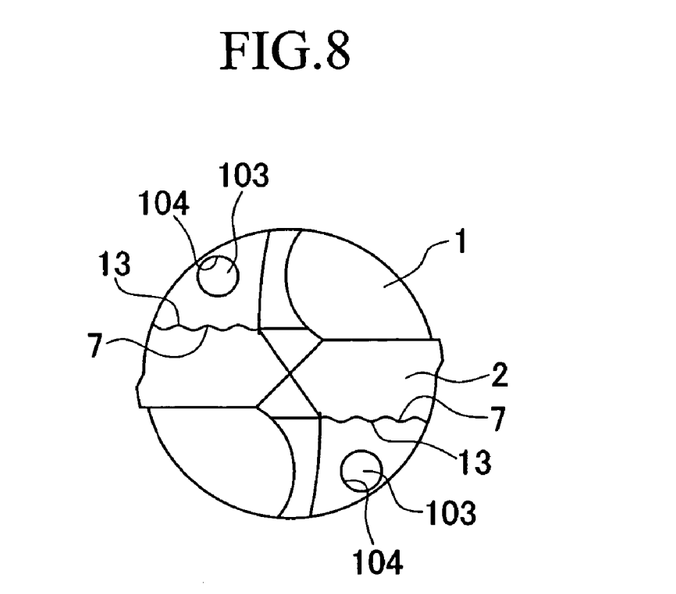
FIG. 8 is a diagram showing another embodiment of a drill of the present invention.

In the above description of this embodiment, machining oil is supplied to the distal end of the insert 2 via the gaps 14 formed between the insert 2 and the drill main body 1; however, as shown in FIG. 8, branched paths 103, which are branched from the flow path 5 and are connected to openings 104 at the distal end face 3 of the drill main body 1, may be formed. In other words, the branched paths shown in FIG. 11 and the gaps 14 according to the present invention may be simultaneously employed. Moreover, the openings 104 of the branched paths 103 may be formed in the outer peripheral surface of the distal end portion of the drill main body 1. In this case, it is preferable that the total cross-sectional area of the gaps 14 be less than that of the branched paths 103, so that machining oil can be supplied through the gaps 14, which open at the vicinity of the cutting edges 2a, at higher pressure. On the other hand, the strength of the distal end portion of the drill main body 1 is ensured since the branched paths 103 are not provided. The gaps 14 may be formed at only one of the ridge portions of the convex portions 13 (i.e., the groove bottoms of the guiding grooves 7) and the valleys between the convex portions 13 adjacent to each other (i.e., the ridgelines of the adjacent grooves of the guiding grooves 7). Furthermore, when dry cutting is performed on a workpiece, compressed air acting as a fluid may be supplied instead of supplying machining oil from the machining oil supply unit 9.

Next, another embodiment of the insert according to the present invention will be explained. The same reference symbols are applied to the same or equivalent elements in the above embodiment, and explanations thereof are simplified or omitted.

Figure 9A:
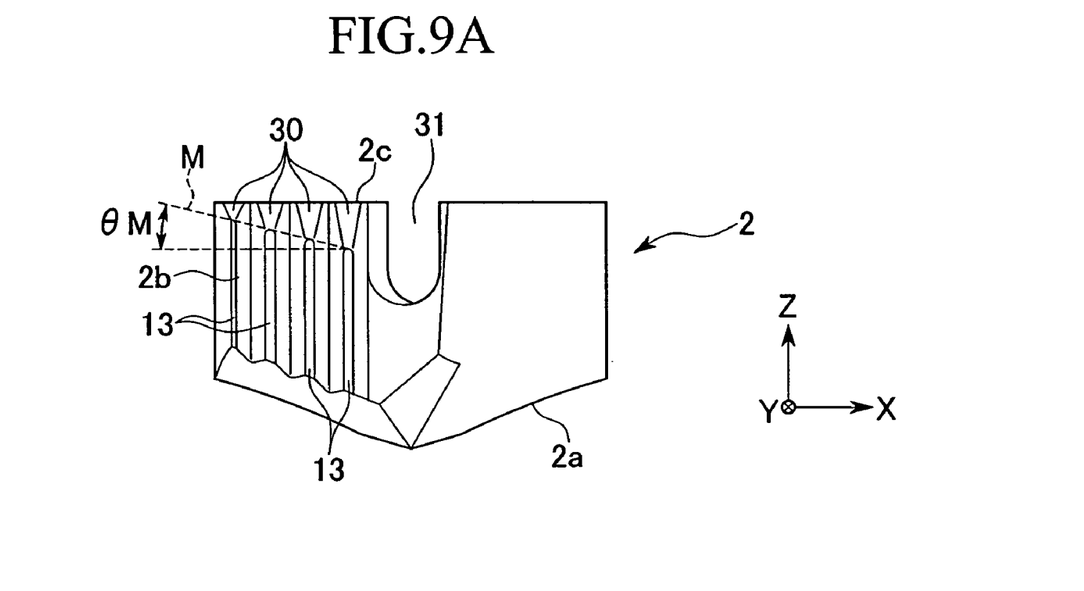
FIGS. 9A and 9B are diagrams showing another embodiment of an insert of the present invention.
Figure 9B:
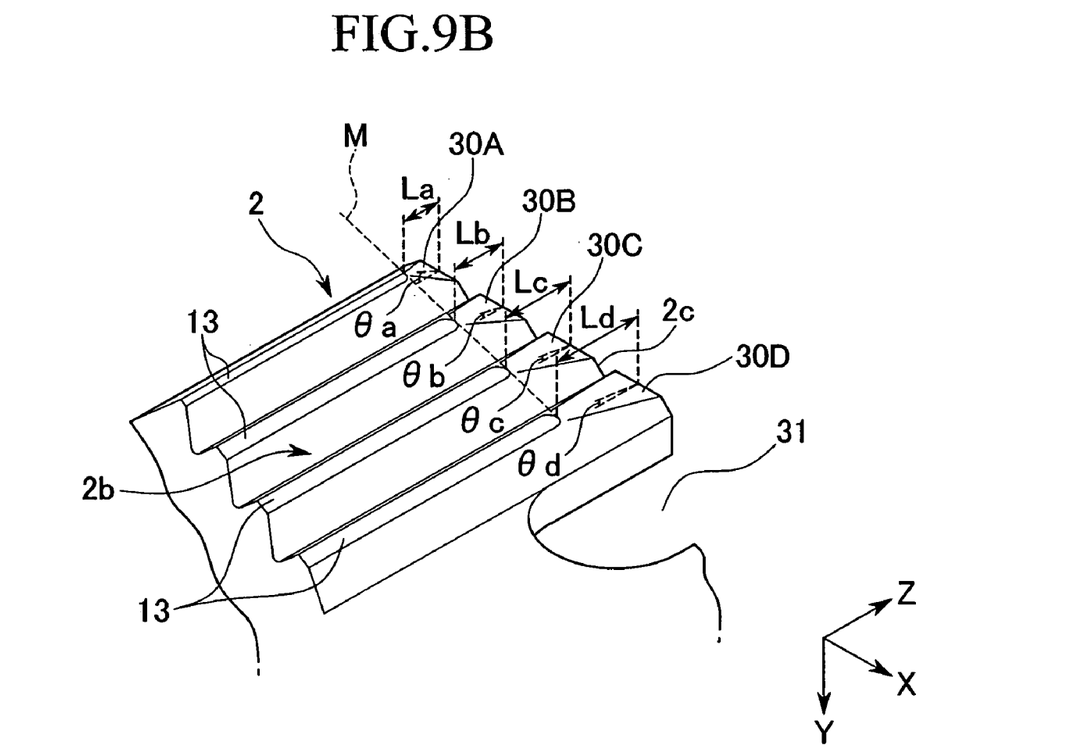

FIG. 9A is a side view showing an insert of this embodiment, and FIG. 9B is an enlarged perspective view showing the main part.

As shown in FIG. 9A, the insert 2 is formed in a substantially pentangular plate shape, and is to be inserted into the concave groove 6 of the drill main body 1. On the outer surfaces 2b of the insert 2, there are formed convex portions 13 which are engageable with the guiding grooves 7 of the drill main body 1. The convex portions 13 are formed so as to extend in the direction of insertion into the concave groove 6 (i.e., in the direction of axis O or in the Z-direction), i.e., the ridgelines thereof coincide with the direction of insertion. The convex portions 13 are arranged side by side in the direction crossing the direction of insertion (i.e., in the X-direction). The convex portions 13 are formed at locations corresponding to the guiding grooves 7 of the concave groove 6 in a state in which the insert 2 is disposed in the concave groove 6.

The convex portions 13 are respectively provided with tapered portions 30 (30A to 30D) each of which is inclined toward the proximal end face 2c of the insert 2. In other words, the tapered portions 30 are formed in such a manner that the thickness of the insert 2 becomes less (i.e., the height of the convex portions 13 is gradually decreased) as it extends toward the proximal end face 2c of the insert 2.

The lengths of the tapered portions 30A to 30D formed on the convex portions 13, when measured in the direction of insertion, i.e., the lengths La to Ld of the tapered portions 30A to 30D measured in the Z-direction, are set so as to be different from each other. In this embodiment, as shown in FIG. 9B, the lengths La to Ld of the tapered portions 30A to 30D are set so as to be gradually decreased, in the direction crossing the direction of insertion, from the center of the outer surface 2b with respect to the X-direction toward an end of the outer surface 2b. More specifically, the length Ld of the tapered portion 30D at the center of the outer surface 2b with respect to the X-direction is the greatest, and the lengths Lc, Lb, and La are set so as to be gradually decreased toward the end of the outer surface 2b with respect to the X-direction. In addition, angles θa to θd between the lines parallel to the Z-axis (axis O) and the surfaces of the tapered portions 30A to 30D are set such that the angle θd corresponding to the tapered portion 30D at the center with respect to the X-direction is the smallest, and the angles θc, θb, and θa of the tapered portions 30 are set so as to be gradually increased toward the end of the outer surface 2b with respect to the X-direction.

The tip sides (−Z sides) of the tapered portions 30A to 30D are arranged on a straight line M, and the angle between the line M and the X-axis is set to be θM (refer to FIG. 9A). The back ends of the tapered portions 30A to 30D coincide with the proximal end face 2c of the insert 2, which is perpendicular to the axis O. Accordingly, the line M is inclined toward the proximal end face 2c as it extends from the center with respect to the X-direction toward the end of insert 2, as shown in FIG. 9A. The tapered portions 30A to 30D are formed such that the back ends of the convex portions 13 are chamfered by a single plane including the line M.

Figure 10A:
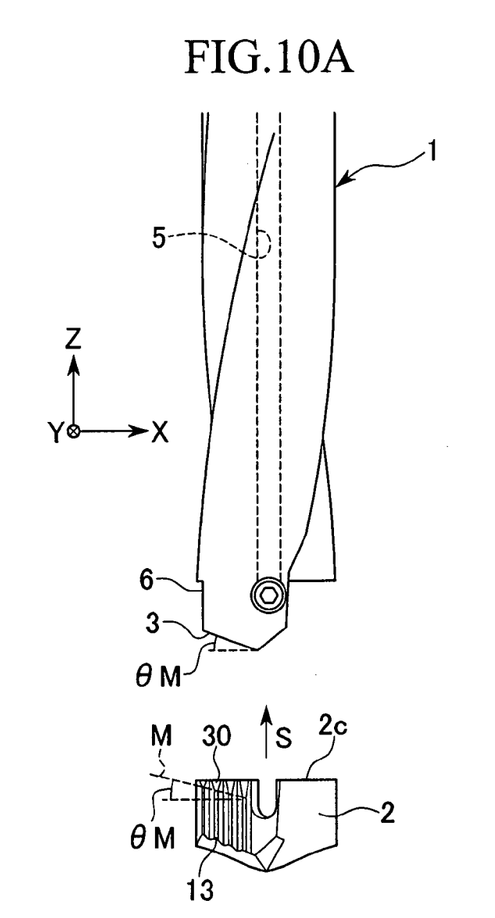
FIGS. 10A, 10B, and 10C are diagrams for explaining an insertion operation of the insert shown in FIGS. 9A and 9B into a concave groove formed in a drill main body.

On the other hand, as shown in FIG. 10A, the distal end portion of the drill main body 1 is formed in a substantially V-shape as seen from the side, and the angle between the distal end face 3 and the X-axis is substantially equal to the angle θM between the line M and the X-axis. In other words, the lengths La to Ld of the tapered portions 30A to 30D are set so that the line M, which is defined by the tapered portions 30A to 30D, substantially coincides with the inclination (shape) of the distal end face 3.

Figure 10B:
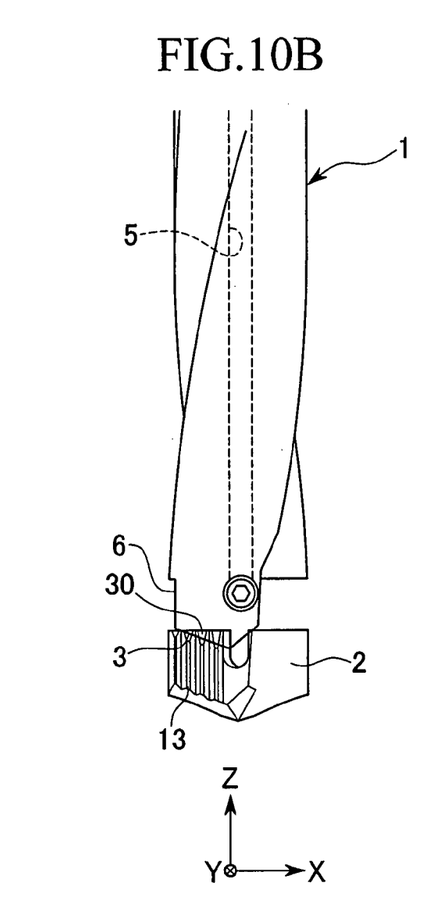
Figure 10C:
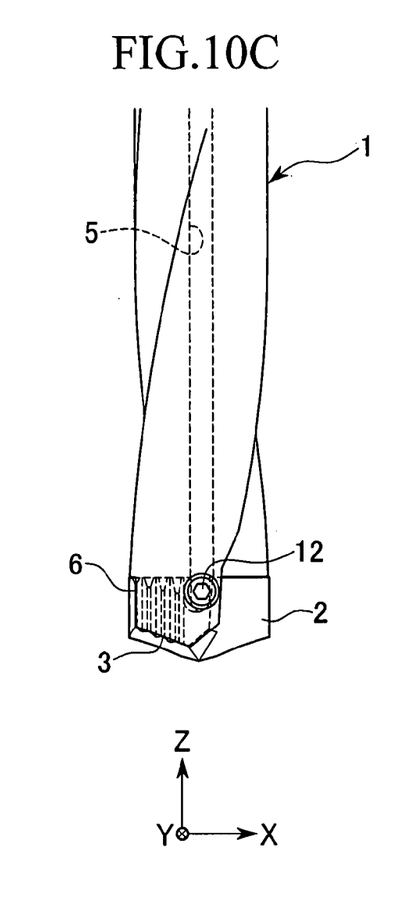

Next, the operation for attaching the insert 2 having the structure explained above to the concave groove 6 of the drill main body 1 will be explained below with reference to FIGS. 10A, 10B, and 10C.

As shown in FIG. 10A, first, the proximal end face 2c of the insert 2 is disposed so as to be opposite the concave groove 6. As explained above, the angle between the distal end face 3 and the X-axis is set to be substantially equal to the angle θM between the line M and the X-axis.

Then, the insert 2 is inserted into the concave groove 6. As shown in FIG. 10B, during the insertion of the insert 2 into the concave groove 6, because the angle between the distal end face 3 and the X-axis is set to be substantially equal to the angle θM between the line M and the X-axis, the convex portions 13 formed on the insert 2 respectively and simultaneously engage the guiding grooves 7 formed in the concave groove 6. More specifically, because the convex portions 13 simultaneously engage the guiding grooves 7 during the inserting operation, the inserting operation of the insert 2 can be smoothly and steadily performed. Then, the insert 2 is further inserted so as to be disposed in the concave groove 6 as shown in FIG. 10C.

In this embodiment, because the lengths La to Ld of the tapered portions 30A to 30D are set so that the line M substantially coincides with the inclination (shape) of the distal end face 3, the convex portions 13 respectively and simultaneously engage the guiding grooves 7 formed in the concave groove 6 during the inserting operation. When the distal end face 3 is formed not in a V-shape, but in a W-shape, or when the portions of the insert 2 at the ends with respect to the X-direction are projected in the −Z-direction from the center portion thereof, the lengths La to Ld of the tapered portions 30A to 30D are set depending on the shape of the distal end face 3 so that the convex portions 13 respectively and simultaneously engage the guiding grooves 7 formed in the concave groove 6. For example, when the distal end face 3 is formed in a W-shape, the line (line M) defined by connecting the tip ends (ends at −Z side) of the tapered portions 30A to 30D is also set in a W-shape.

In this embodiment, a through groove 31, which has a U-shaped cross section while opening at the proximal end face 2c, and which penetrates through the insert 2 between the outer surfaces 2b, is provided at the center of the insert 2 with respect to the X-direction, instead of the through hole 10 of the insert 2. Due to the through groove 31, when the insert 2 is to be removed, the insert 2 can be removed without completely removing the fixing element (bolt) 12 from the drill main body 1. Furthermore, in this embodiment, the ridge portions of the convex portions 13 are chamfered by a plane that extends parallel to the outer surfaces 2b, i.e., a plane perpendicular to the Y-axis. Accordingly, the cross-sectional area of the gaps 14 formed between the ridge portions and the groove bottoms of the guiding grooves 7 can be increased, so that a greater amount of predetermined fluid such as machining oil can be supplied to the distal end portion of the drill main body 1, while maintaining the stable attachment of the insert 2. In the guiding grooves 7, the ridge portions between the grooves adjacent to each other may be similarly chamfered, so that both the ridge portions of the convex portions 13 and the ridge portions between the grooves of the guiding grooves 7 are chamfered by planes.

INDUSTRIAL APPLICABILITY

According to the present invention, because the guiding grooves extending in the direction of the axis are formed on the inner surface of the concave groove, the throwaway insert includes convex portions on the outer surface thereof that are engageable with the guiding grooves, and a serrated structure is constituted by the guiding grooves and the convex portions, the insert can be easily attached to the drill main body just by inserting the insert from the distal end in a sliding manner while engaging the convex portions with the guiding grooves, and the aligning accuracy of the insert with respect to the drill main body can be improved. In addition, because the serrated structure is employed, the insert will not move with respect to the drill main body when a workpiece is machined by the insert while rotating the drill main body, and thus, the rotational force of the drill main body is surely and efficiently transmitted to the insert. In addition, by providing tapered portions on the convex portions of the insert, the insertion operation into the concave groove of the drill main body can be smoothly performed. Accordingly, a stable drilling operation can be performed while maintaining preferable machining accuracy.

The invention claimed is:

1. A drill having an axis comprising:
a drill main body being rotatable about the axis including:
   a distal end face formed in an isosceles triangle shape;
   a concave groove which opens to the distal end face and forms a plate-shape space along the axis; and
   a plurality of guiding grooves provided on an inner surface of the concave groove, and extending in a direction of the axis; and
a throwaway insert formed in a plate-shape and detachably attached to the plate-shape space of the drill main body including:
   a plurality of convex portions provided on an outer surface of the throwaway insert, which are formed such that each of ridges thereof extends in the direction of the axis, arranged side by side in a direction crossing the axis, and engageable with the guiding grooves; and tapered portions, each of which is connected to each proximal end of the convex portions, and inclined so that a height thereof with respect to an outer surface of the throwaway insert is lowered toward a proximal end of the throwaway insert along the direction of the axis, wherein distal ends of the guiding grooves and the tapered portions are arranged following the isosceles triangle shape of the distal end face of the drill main body, and the throwaway insert is attached to the drill main body by being inserted into the concave groove along the axis from the distal end face to the concave groove while engaging the convex portions with the guiding grooves.

2. A drill according to claim 1, wherein the drill main body is provided with a flow path which extends from a bottom face of the concave groove that faces toward the distal end face, and which opens outside the drill main body so as to allow a predetermined fluid to flow therethrough, and gaps are formed between the guiding grooves and the convex portions engaging with each other, which allow the fluid to flow between a distal end of the throwaway insert and the proximal end thereof that faces the bottom face of the concave groove.

3. A drill according to claim 2, wherein the bottom face is provided with a cavity which is connected to the gaps.

4. A drill according to claim 2, wherein at least ridge portions of the convex portions ridge portions or between the guiding grooves are chamfered so as to have flat surfaces.

5. A drill according to claim 1, wherein lengths of the tapered portions are set so as to be gradually decreased, in a direction crossing a direction of insertion, from a center toward an end of the outer surface.

* * * * *